United States Patent [19]

Tarlow et al.

[11] Patent Number: 4,998,704

[45] Date of Patent: Mar. 12, 1991

[54] PORTABLE MEMO PAD HOLDER DEVICE FOR CAR AND PHONE

[75] Inventors: Kenneth A. Tarlow, Marina del Rey, Calif.; Ronald E. Gray, 2392 Stony La., Brea, Calif. 92621

[73] Assignee: Ron Gray, Brea, Calif.

[21] Appl. No.: 463,410

[22] Filed: Jan. 11, 1990

[51] Int. Cl.⁵ .............................................. A47F 7/00
[52] U.S. Cl. .................... 248/447.1; 248/450; 248/452; 248/206.2; 248/206.5
[58] Field of Search .................. 248/452, 442.2, 447.1, 248/447.2, 206.5, 206.3, 441.1, 450, 205.5, 206.2; 379/447

[56] References Cited

U.S. PATENT DOCUMENTS

| | | | |
|---|---|---|---|
| D. 254,253 | 2/1980 | Haley | D14/3 |
| D. 261,510 | 10/1981 | Havens | D14/3 |
| D. 277,480 | 2/1985 | Jackwicz | D14/61 |
| 2,167,046 | 7/1939 | Hull | 248/205.5 |
| 2,603,896 | 7/1952 | Bennett | 248/447.1 X |
| 2,696,389 | 12/1954 | Cessford | 248/206.5 |
| 2,862,328 | 12/1958 | Wadsworth | 248/452 X |
| 4,456,286 | 6/1984 | Jamar | 248/452 X |
| 4,484,033 | 11/1984 | Licari | 379/447 |

FOREIGN PATENT DOCUMENTS

| | | | |
|---|---|---|---|
| 0412158 | 6/1946 | Italy | 248/447.2 |
| 591229 | 9/1977 | Switzerland | 248/447.1 |

Primary Examiner—Alvin C. Chin-Shue
Attorney, Agent, or Firm—Poms, Smith, Lande & Rose

[57] ABSTRACT

A portable memo pad holder device which can be transported in a vehicle between the vehicle and a remote phone. The device includes a removable pad and a mount adapted to fit on the standard cradle of a telephone in place of the transmitter-receiver. The mount also includes a suction cup for removably attaching the device to the dashboard or the like of a vehicle. Thus, the device can be moved back and forth between the vehicle and a remote telephone.

10 Claims, 3 Drawing Sheets

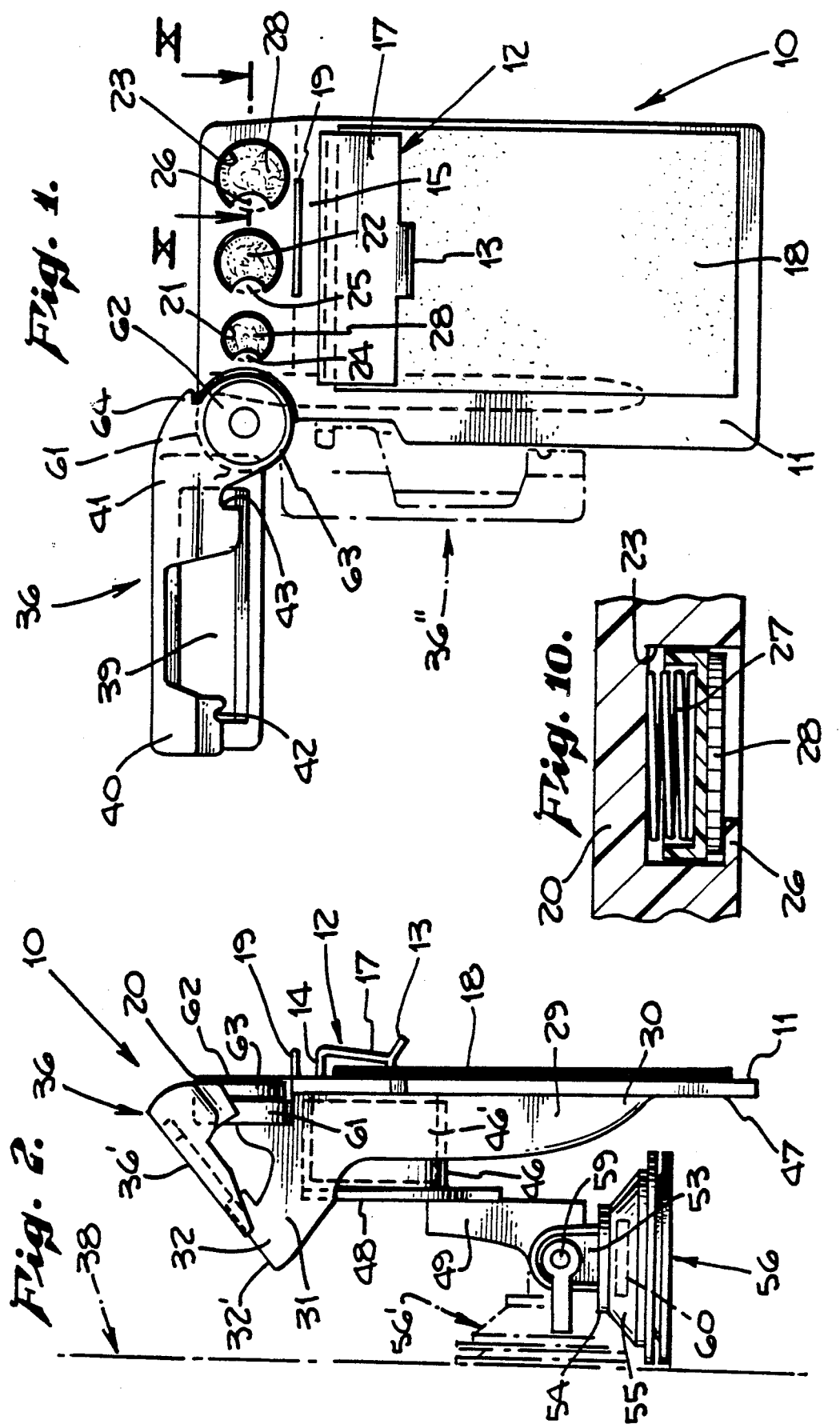

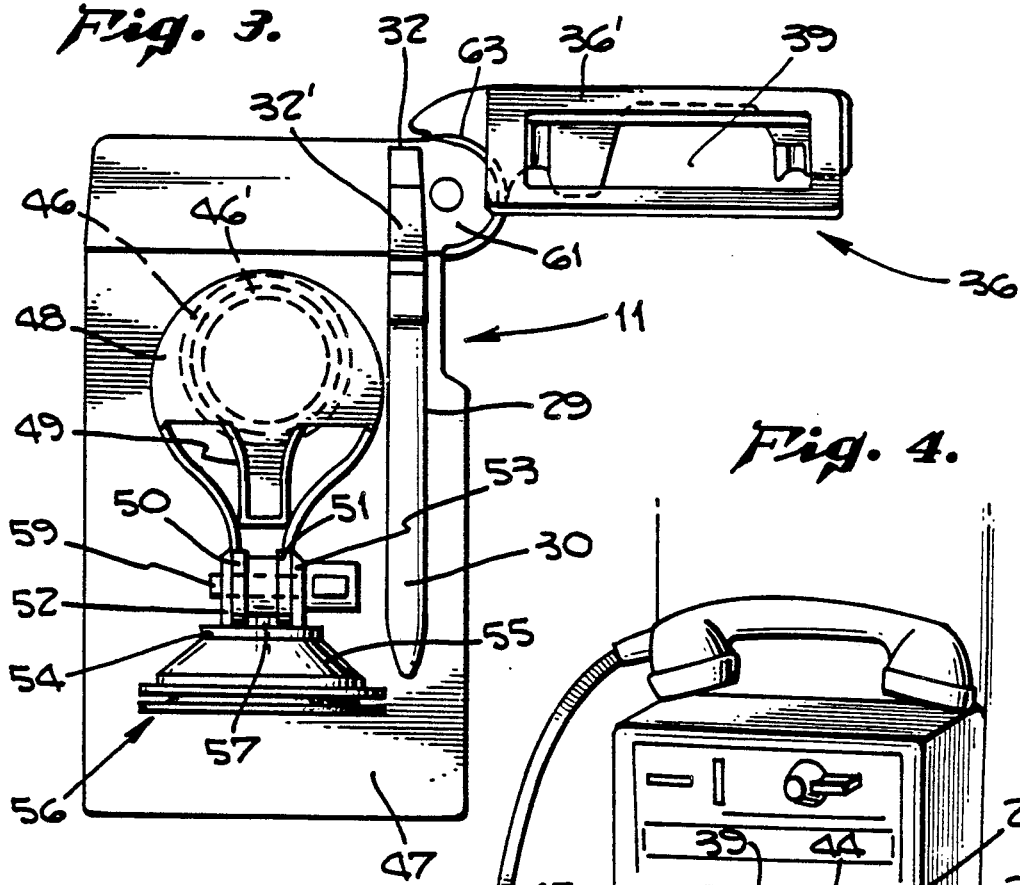
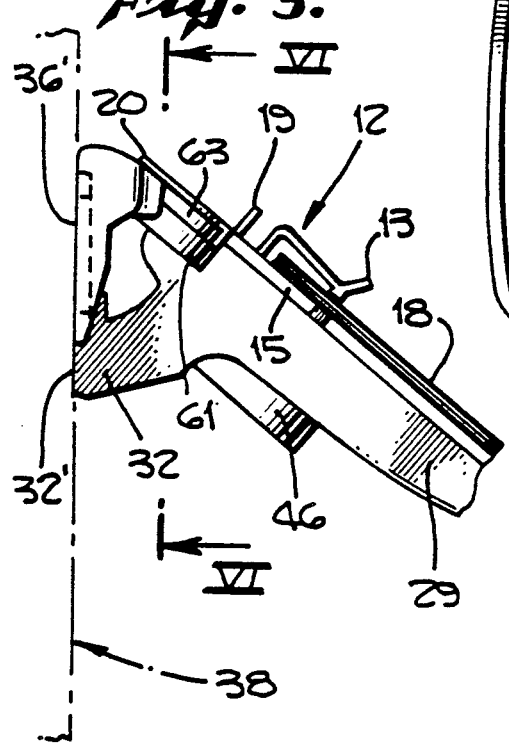
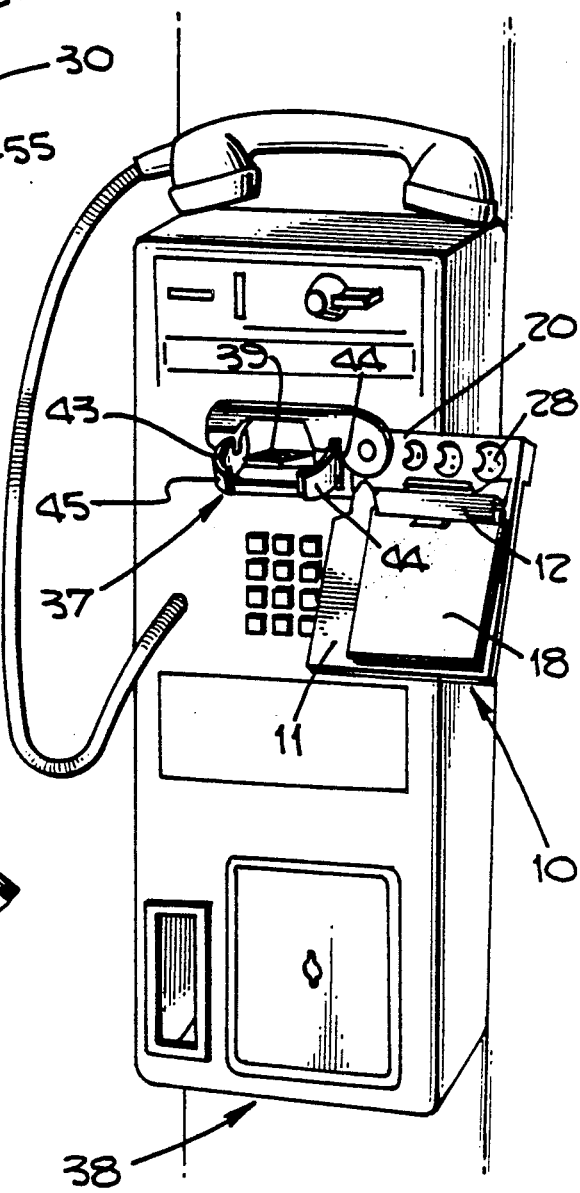

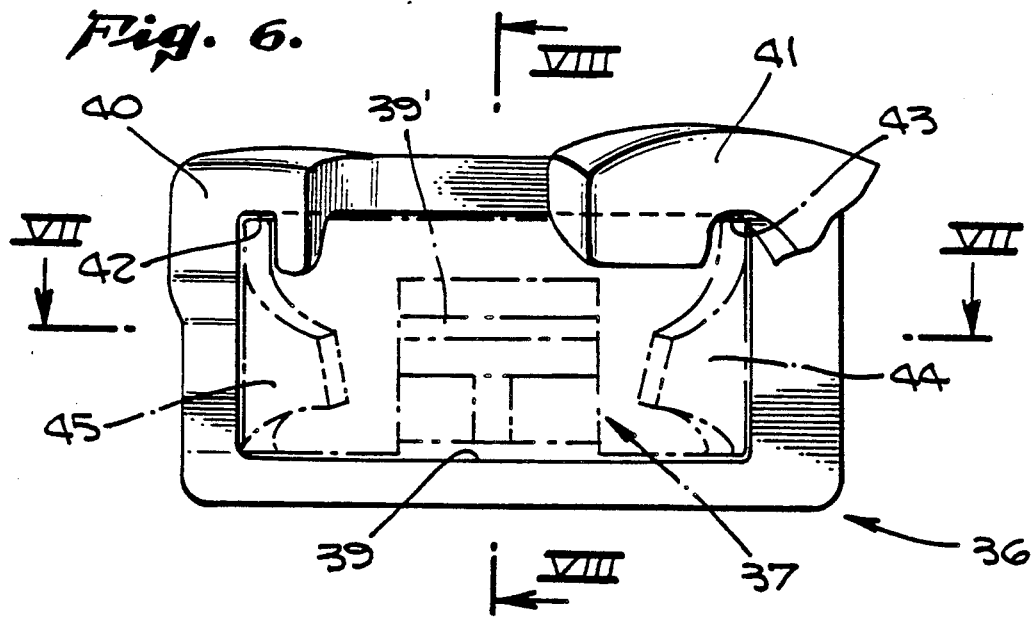
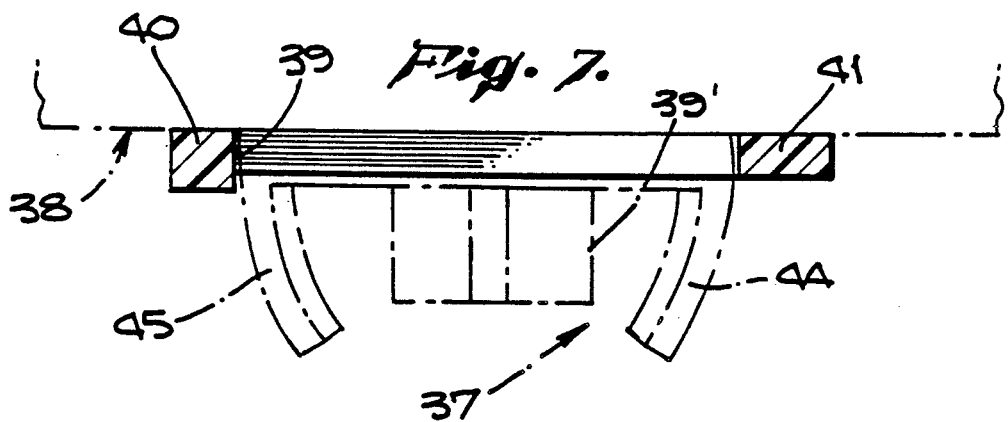
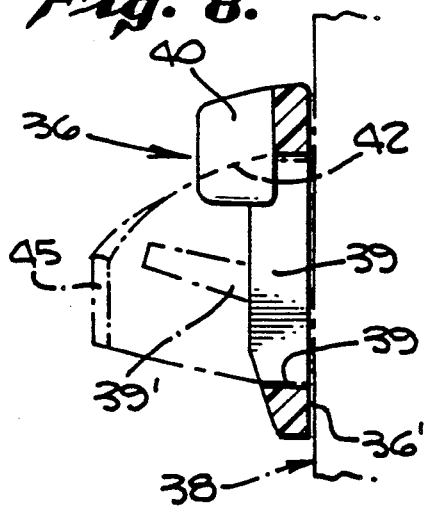
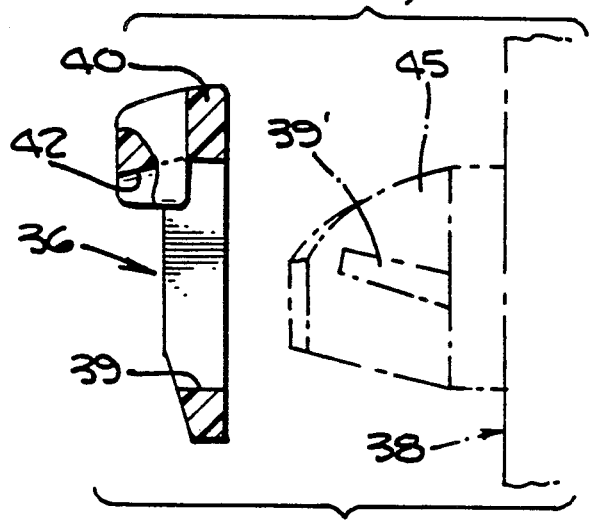

//4,998,704//

PORTABLE MEMO PAD HOLDER DEVICE FOR CAR AND PHONE

BACKGROUND OF THE INVENTION

1. Field of the Invention

The invention relates to memo pad devices; and, more particularly, to a portable device holding a replaceable memo pad that can be transported between a phone booth and a vehicle.

2. Description of the Prior Art

Various types of memo pad holders are known in the art. Such holders typically have a spring biased grip for holding a pad and a place on the holder for retaining a writing instrument. Some such holders may have means, such as a magnet or suction cup, so the holder can be releasably attached to a supporting surface.

Although such devices are portable, and can be carried between home and vehicle, for example, they cannot be mounted temporarily in a phone booth or the like. They must be laid on a seat or shelf and use thereof is thus quite cumbersome.

There is thus a need for a memo pad holder which can be transported between a vehicle and a phone booth, mounted temporarily in both locations, yet provide a firm and steady writing surface.

SUMMARY OF THE INVENTION

It is an object of this invention to provide a portable memo pad holding device for a car and remote telephone.

It is a further object of this invention to provide such a device which has removable attachment means for removably and selectively attaching the device to a vehicle or cradle of a telephone.

These and other objects are preferably accomplished by providing a portable memo pad device which can be transported in a vehicle between the vehicle and a phone booth. The device includes a removable pad and a mount adapted to fit on the standard cradle of a telephone booth out in public in place of the transmitter-receiver. The mount also includes a suction cup for removably attaching the device to the dashboard or the like of a vehicle. Thus, the device can be moved back and forth between a vehicle and a remote telephone.

BRIEF DESCRIPTION OF THE DRAWING

FIG. 1, is a vertical elevational view of the device of the invention;

FIG. 2 is a side view of the device of FIG. 1;

FIG. 3 is a rear view of the device of FIG. 1;

FIG. 4 is a vertical elevational view of a conventional commercial telephone showing the device of FIGS. 1 to 3 mounted on the cradle of the telephone;

FIG. 5 is a side view of the mounted device of FIG. 4;

FIG. 6 is a front view taken along lines VI-VI of FIG. 5;

FIG. 7 is a view taken along lines VII-VII of FIG. 6;

FIG. 8 a view taken along lines VIII-VIII of FIG. 6;

FIG. 9 is a view similar to FIG. 8 showing a second position of the parts thereof; and FIG. 10 is a view taken along lines X-X of FIG. 1.

DESCRIPTION OF THE PREFERRED EMBODIMENT

Referring now to FIG. 1 of the drawing, a portable memo pad holder device 10 is shown having a generally flat planar main body portion 11 with a resilient clip 12, having an integral grasping tab 13, mounted on body portion 11. As seen in FIG. 2, clip 12 is generally L-shaped having a short leg portion 14 integral with a flange member 15 (see also FIG. 1) mounted to body portion 11 or forming a portion thereof in any suitable manner. As is well known in the art, clip 12 is resiliently and integrally hinged to body portion 11 and, thus, by grasping tab 13, the longer leg portion 17 can be pulled away from body portion 11 so that a writing pad 18 of paper can be snapped thereunder and be removably retained therein.

As also seen particularly in FIG. 2, an elongated pen retaining tab 19 (see also FIG. 1) is provided integral with body portion 11 and extending away from body portion 11. Tab 19 is spaced from leg portion 14 a sufficient distance such that a pencil or pen (not shown) can be snapped therebetween and be retained therein until it is necessary to use the same as a writing instrument.

Main body portion 11 has an integral upper portion 20 having a plurality of circular cavities 21 to 23 therein, each cavity 21 to 23 being blocked off partially at the side by a flange portion (e.g., flange portions 24 to 26, respectively). As seen in FIG. 10, each cavity 21 to 23 has a spring 27 therein with a plurality of coins 28 between spring 27 and flange portion 26 (for example). Thus, cavities 21 to 23 vary in diameter, each receiving a different size coin therein, such as dimes in cavity 21, nickels in cavity 22 and quarters in cavity 23. The springs 27 bias the coins outwardly for easy removal. Of course, flange portions 24 to 26 serve to retain the coins in their respective cavities until removal.

As seen in FIG. 2, a support 29 is integral with the back of body portion 11 having a lower elongated portion 30 and an upper enlarged generally triangular portion 31. Portion 31 has a flat angled portion 32 (see also FIG. 3). As seen in FIG. 2, the angle of surface 32' is generally parallel to the angle of surface 36' of support 36 (e.g., about 45° with respect to the horizontal) so that, when in the position shown in FIG. 4, pad 18 is at a desired writing angle.

Support 29, along with pivotable support 36 (FIG. 1) serves to support device 10 on the conventional cradle 37 of a telephone 38 (FIG. 4). Thus, as seen in FIG. 1, support 36 is generally rectangular having an open generally rectangular area 39 for receiving therein the hook 39' (see particularly FIGS. 6 and 7) of the telephone 38, the hook 39 being free to move up and down. Support 36 also includes spaced enlarged portions 40, 41 (FIG. 1) at the top right and left side of support 36. Enlarged portion 40 has a groove 42 therein while enlarged portion 41 has a groove 43 therein. As seen in FIGS. 2 and 3, support 20 has an integral generally circular portion 61 with a spaced circular flange 62 (see also FIG. 1). Rectangular support 36 (FIG. 2) has a circular boss 63 rotatable between portion 61 and flange 62 with a lip portion 64 acting as a stop (FIG. 1) which abuts against support 20. As seen in FIG. 6, the right cradle portion 44 of cradle 37 is received in groove 43 whereas the left cradle portion 45 of cradle 37 is received in groove 43. As seen in FIG. 5, flat angled portion 32 abuts against the telephone 38 and serves to support device 10 so that pad 18 is in the angled position shown in FIGS. 4 and 5 for writing thereon. Thus, as seen in dotted lines in FIG. 1, support 36 moves from the cradle support or solid line position to the dotted line or stored position 36" (i.e., when mounted to a telephone or then to a vehicle).

As seen in FIG. 2, a generally cylindrical housing 46 is secured to the back of 47 of support 11 and has a like configured plate 48 (see also FIG. 3) secured to a cylindrical housing 46' rotatably and removably mounted in like configured cylindrical housing 46. Plate 48 has a Y-shaped flange 49 secured at the bottom having spaced ears 50, 51 receivable between spaced flanges 52, 53 extending upwardly from a circular boss 54 integral with a generally conically shaped housing portion 55.

A resilient suction cup 56 is mounted within the front surface of housing portion 55 having a shaft 57 extending therethrough (and through boss 54) between ears 50, 51. A lever 58 (FIG. 5) is fixed to a shaft 59 extending through ears 50, 51 and flanges 52, 53 and configured to shaft 57 so that, when lever 58 is rotated, shaft 57 moves up and down between ears 50, 51 to lock suction cup 56 to a support surface as is well-known in the suction cup art. If desired, a magnet 60 (see the dotted lines in FIG. 2) may be mounted within housing portion 55 to increase the grip of suction cup 56 when secured to a metallic surface.

It can be appreciated that flanges 52, 53 allow portions 55-56 and 60 to be pivoted about shaft 59 so that the suction cup 56 can be pivoted out of the way when device 10 is temporarily mounted to telephone 38 as seen in FIGS. 2, 3, and 5.

Thus, in operation, when device 10 is mounted on the cradle 37 of telephone 38 as heretofore discussed, the user can take coins from upper portion 20, as previously discussed, put them into the phone 38 and use the same. The device 10 is firmly and positively supported in writing position on telephone 38 (suction cup 56 being in the stored position in FIG. 5).

After use, the device 10 is quickly and easily removed from telephone 38 (see FIGS. 8 and 9) and returned to the vehicle of the user. Suction cup 56 can now be pivoted to the dotted line position 56' shown in FIG. 2 and the device 10 can now be secured to any convenient support surface, such as the dashboard of a vehicle, merely by rotating lever 58 and locking suction cup 56 to the desired support surface. If the latter is metallic, magnet 60 will increase the grip until it is desired to release the same by releasing lever 58.

Since housing 46' merely fits within housing 46, the housing 46', plate 48 and parts connected thereto can be removed, as seen in FIG. 5, when the device 10 is used on telephone 38. Further, since housing 46' also rotates within housing 46, the orientation of pad 18 can be changed so that it is convenient to use.

It can be seen that there is disclosed a portable memo pad device easily movable between car and remote telephone and temporarily secured at the telephone in a writing position. The device can be stored in a brief case for use in other remote locations, such as an airport terminal. After use, the device is easily returned to the vehicle and secured to a supporting surface thereon, preferably adjacent the driver, such as a part of the dashboard or windshield.

I claim:

1. A portable memo pad holder device for transporting between vehicle and a remote telephone wherein the latter has a cradle with a hook therein, said hook normally freely movable up and down, the device comprising;
    a generally planar main body portion having a generally flat front surface and a rear surface with a resilient clip mounted on said front surface for retaining a writing pad on said main body portion;
    a cradle support pivotally mounted to said main body portion by a pivot member movable from a stored position adjacent said main body portion to a position extending outwardly away from said main body portion, said cradle support being a generally rectangular frame having an open generally rectangular area for receiving therein said hook in a manner allowing said hook to move freely up and down, said cradle support frame having a first enlarged portion at the top thereof on one side of said open area and a second enlarged portion at the top thereof on a side of said open area opposite said first mentioned one side of said open area, a first elongated generally horizontally extending member interconnecting said first and second enlarged portions, a side member extending downwardly from each of said enlarged portions, and a second elongated generally horizontally extending member interconnecting said side members, said enlarged portions, said side members, and said elongated members defining said frame, said rectangular area lying in generally a vertical plane, said enlarged member adjacent said pivot member being wider than said enlarged member remote therefrom, each of said enlarged members having a groove formed in the lowermost portions thereof, each of said grooves opening downwardly with respect to said frame, each of said enlarged members extending away from the plane of said rectangular area and outwardly therefrom, said cradle being adapted to be received in said grooves; and
    an abutment member on the rear surface of said main body position extending away therefrom adapted to abut against a supporting surface.

2. In the device of claim 1 wherein said abutment member terminates in a flat surface at an angle of less than 90° with respect to the plane of said main body portion when in the position extending outwardly away from said main body portion.

3. In the device of claim 1 including detachable securement means attached to the rear surface of said main body portion for detachably securing said device to a support surface.

4. In the device of claim 3 wherein said detachable securement means is pivotally coupled to said main body portion movable from a position extending outwardly away from said main body portion to a position adjacent said main body portion.

5. In the device of claim 3 wherein said detachable securement means is removable from said main body portion.

6. In the device of claim 3 wherein said detachable securement means is rotatable with respect to said main body portion for changing the orientation thereof.

7. In the device of claim 3 wherein said detachable securement means includes a suction cup for adhering said device by suction to a supporting surface.

8. In the device of claim 7 including a magnet associated with said suction cup.

9. In the device of claim 1 wherein said main body portion includes coin storage means for storing a plurality of coins thereon.

10. In the device of claim 1 wherein said main body portion includes writing implement storage means for storing a writing implement thereon, said storage means including a resilient clip mounted on said main body portion between said clip and said body portion for holding a pad and an elongated tab mounted on said main body portion and extending generally parallel to said clip and spaced therefrom a distance generally related to the diameter of a conventional pen or pencil whereby a pen or pencil can be snapped between said clip and said tab and be removably retained therein.

* * * * *